Patented Sept. 12, 1933

1,926,758

UNITED STATES PATENT OFFICE 1,926,758

PROCESS OF MAKING HEXAVALENT CHROMIUM COMPOUNDS FROM CHROMIUM ALLOYS

Marvin J. Udy, Niagara Falls, N. Y., assignor to Electro Metallurgical Company, a corporation of West Virginia No Drawing. Application July 23, 1928
Serial No. 294,939

8 Claims. (Cl. 23—56)

The invention is a process of making hexavalent chromium compounds from chromium alloys. The compound initially produced is a calcium chromate, but this can easily be converted into other chromates, or dichromates, or chromic acid or chromic acid anhydride (Cr O₃). Various alloys may be used as the source of chromium, but the process has been particularly developed for the utilization of the cheapest of these, viz. ferrochrome made by the direct reduction of chrome ore with carbon. The usual commercial form of this alloy carries over 4% of carbon.

I have found that calcium chromate can readily be formed by roasting chromium alloys, such as ferrochrome, in the presence of lime. The alloy and lime are preferably very finely ground, and intimately mixed. The charge may consist of a mixture of approximately equal parts of quicklime and ferrochrome, containing for example 60% to 70% Cr, both ground to pass a 200 mesh screen. Slaked or hydrated lime in somewhat greater quantity to provide an equal amount of CaO may be substituted for the quicklime.

I have also discovered that the conversion of the elemental chromium to calcium chromate is promoted by the presence of small quantities of substances which appear to act as catalysts. Many different chemical compounds have this effect, the compounds of sodium or potassium, and especially the carbonates of these metals, and lead peroxide, being mentioned by way of example. An addition of sodium carbonate constituting a fraction of a per cent of the charge expedites the conversion to a marked degree. Larger proportions can of course be used.

As the charge of ferrochrome and lime is heated, a perceptibly exothermic reaction sets in at about 600° C. to 700° C. When this reaction has subsided the temperature is preferably carried higher, for example to 800° C. to 1000° C. and the high temperature is maintained for some hours with free access of atmospheric oxygen to the charge. The time required to attain an economical degree of conversion will vary with the composition of the charge, the fineness of its constituents, the type of furnace employed, and other factors. From five to twenty hours is usually required. The iron present in the ferrochrome is converted to oxide by the roasting.

The roasted product may be treated in a great variety of ways, according to the product desired. Many of these ways are apparent from the known chemistry of the hexavalent chromium compounds, and it will be unnecessary to describe them here.

Water leaching of the product of roasting will slowly dissolve the calcium chromate therefrom, but I prefer to leach with dilute sulphuric acid. The quantity of acid used may vary widely. It may be equivalent only to the excess lime, or an additional quantity equivalent to half or all of calcium present as chromate may be introduced. In some cases still more acid is used to promote solution of the chromium compound. The iron oxide present in the roasted charge is in a form difficultly soluble in dilute acid, but increasing quantites of iron will in general be dissolved as the acidity of the leaching medium is increased. When acid is used in the leaching, calcium carbonate may be added to the resulting solution and substantially all of the dissolved iron will precipitate due to the partial neutralization thus effected. In some modifications of the process I add acid to the leachings after the insoluble residue is removed. This gives a suitable solution from which to crystallize chromic anhydride or dichromates, and at the same time gives a better separation of chromium compound from iron than would be had if a strongly acid liquid were used in the leaching step.

When the desired product is a chromate it may be convenient to leach with an acid liquid, thus forming a solution which, if directly evaporated, would give a dichromate or chromic acid anhydride, and to neutralize the excess acid in the leachings with lime or other base. The neutralization will be accompanied by the precipitation of iron and other impurities which may be removed before further treatment of the solution.

Chromates and dichromates of metals other than calcium can of course be formed by treating the solutions mentioned above with appropriate compounds of such metals, such conversions forming no part of the present invention.

The yield of hexavalent chromium compounds will of course vary with the conditions. A conversion of 70% of the chromium taken is readily attained, and the conversion may exceed 90%. Fine grinding and intimate mixing of the charge raises the yield. The best yields have been had where the ferrochrome was ground considerably finer than was necessary to enable it to pass a 200 mesh screen. The degree of conversion is also improved by roasting a charge, then cooling and crushing it, and roasting again, but such procedure will not ordinarily be economical. The insoluble residue left on leaching the roasted product may of course be returned to the process, as may also any other chromium-containing by-products of the main operation.

The following example will additionally illustrate the process.

Two hundred weights of high-carbon ferrochrome ground to pass a 200 mesh screen were milled in a ball mill with 250 weights of slaked lime and 0.70 weight of sodium carbonate. The ferrochrome had the following analysis:

|    | Per cent |
|----|----------|
| Cr | 69.10    |
| C  | 4.73     |
| Si | 1.43     |

The mixture was roasted at 700° C. until the exothermic reaction had ended. The temperature was then gradually raised to a point between 800° C. and 1000° C., and additionally roasted. The entire roasting required about 8 hours. Analysis of the product gave the following figures:

|                     | Per cent |
|---------------------|----------|
| Total chromium      | 25.79    |
| Hexavalent chromium | 22.52    |

The conversion was therefore upward of 87%.

The roasted product was extracted with a mixture composed of 304 parts by weight of 1.84 sp. gr. sulphuric acid and 1500 parts by weight of water. The solution thus formed was treated with an excess of calcium carbonate and filtered. To the filtrate there was added a sufficient quantity of sulphuric acid to liberate the chromic acid, and the bulk of the calcium was removed as calcium sulphate by concentrating the solution and causing the salt to crystallize. When the calcium had been removed, the residual solution was additionally concentrated and the chromic acid anhydride crystallized. It contained 50% Cr, 0.4% CaO, 0.5% $SO_4$, and some water. A purer product can be obtained by recrystallization and obvious refinements in the process.

I claim:

1. The process of making hexavalent chromium compounds, which comprises roasting and intimate mixture of finely ground ferrochrome, lime, and alkali-metal carbonate, said carbonate constituting less than one per cent of the charge.

2. A process of making hexavalent chromium compounds which comprises roasting a comminuted chromium alloy in the presence of lime and a relatively minute amount of a catalytically acting substance.

3. The process of making hexavalent chromium compounds which comprises roasting a comminuted chromium alloy in the presence of lime and a catalyst selected from the group consisting of sodium carbonate, potassium carbonate and lead peroxide.

4. The process of making hexavalent chromium compounds which comprises roasting a comminuted ferro-chrome in the presence of lime and a relatively minute amount of a substance accelerating the action between the reactants.

5. The process of making hexavalent chromium compounds which comprises roasting comminuted ferro-chrome in the presence of lime and a catalyst selected from the group consisting of sodium carbonate, potassium carbonate and lead peroxide.

6. Process which comprises roasting a comminuted mixture containing a chromium-iron alloy, lime and less than 1% of alkali, treating the resulting mixture composed largely of oxides of iron and calcium chromate with a dilute solution of an acid which forms sparingly soluble salts of calcium, thereby producing a solution containing calcium chromate and some iron salts, treating the solution thus obtained with a carbonate of a metal which forms sparingly soluble salts of the said acid, thereby forming in the solution insoluble iron compounds, and separating the solution from insoluble residue.

7. Process which comprises roasting a comminuted mixture containing a chromium-iron alloy, lime and less than 1% of alkali, treating the resulting mixture composed largely of oxides of iron and calcium chromate with a dilute solution of sulphuric acid, thereby producing a solution containing calcium chromate and some iron salts, treating the solution thus obtained with calcium carbonate in excess, thereby forming in the solution insoluble iron compounds, and separating the solution from insoluble residue.

8. Process which comprises treating with a dilute solution of sulphuric acid a highly oxidized mixture composed mainly of calcium chromate and iron oxides, said dilute solution of acid having the approximate proportions of 1500 parts by weight of water and 304 parts by weight of sulphuric acid of 1.84 specific gravity, and precipitating iron salts from the resulting chromium-containing solution thus obtained by adding to the solution an excess of calcium carbonate.

MARVIN J. UDY.